INVENTOR.
ROBERT D. LOGAN
BY
ATTORNEY.

INVENTOR.
ROBERT D. LOGAN
BY

ATTORNEY.

UNITED STATES PATENT OFFICE 3,309,851
Patented Mar. 21, 1967

3,309,851
COTTON SCAVENGER
Robert D. Logan, Rte. 1, Box 49, Blythe, Calif. 92225
Filed Aug. 7, 1963, Ser. No. 300,592
47 Claims. (Cl. 56—12)

This invention relates to scavenging apparatus and more particularly to an improved apparatus for recovering fallen cotton and gathering it into a receptacle therefor in a greatly improved and more expeditious manner and including means for separating debris, leaves, stalks, and other matter from the cotton en route to the storage receptacle.

The use of modern mechanized harvesting equipment for harvesting cotton results in valuable quantities of cotton being scattered on the ground and intermixed with leaves, grass, weeds and even dirt. As high as 10 to 20 percent of the crop is commonly lost in this manner following the passage of the mechanical harvesting equipment.

Various proposals have been made for recovering this fallen cotton but all are found subject to serious disadvantages and shortcomings sought to be avoided by the present invention. The recovery is complicated by various factors. The cotton is light and its fibers easily become entangled with other plants. This is particularly serious as respects leaves and other foreign material of a dry nature which remains attached to the cotton if an attempt is made to gather it from the ground.

Other adverse factors include the fact that cotton is commonly grown on irrigated land formed with water distributing channels or furrows extending lengthwise of the rows. The cotton plants are arranged in rows to either side of these irrigation furrows. If the cotton is subjected to action of wind and rain after falling from the plants it often becomes semiburied with the result that it is difficult to dislodge such cotton. To be effective it is therefore important that the recovery equipment be so designed that it is capable of dislodging the cotton not only when semiburied but also when it is entangled with weeds, plants and the like. At the same time it is important that a minimum quantity of dirt, leaves and other debris with which it is initially engaged be separated and prevented from entering the recovery apparatus. That portion of the debris and foreign matter entering the apparatus must then be separated and ejected from the apparatus without risk of losing the recovered cotton.

Equipment heretofore proposed for the purpose just referred to has been quite unsatisfactory and subject to serious shortcomings including ineffectiveness in recovering fallen cotton and incapability to clean and separate out foreign matter to acceptable minimum standards. In consequence recovered cotton carries highly objectionable quantities of foreign matter with it and this causes serious damage to ginning equippment through which all cotton is passed when first received from the grower.

The improved cotton scavenging and pre-cleaning apparatus and the method practiced thereby according to this invention embodies important improvements over the invention disclosed in my copending application for United States Letters Patent Serial No. 107,573, now Patent No. 3,100,368 filed May 3, 1961 and entitled Apparatus for Recovering Cotton from the Ground.

It is a primary object of the present invention to provide a new and improved cotton scavenging apparatus and a method for recovering cotton which has become detached from cotton plants and for separating it from foreign matter while en route to storage receptacle means carried by the apparatus.

Another object of the invention is to provide power operated cotton scavenging apparatus adapted to be propelled along rows of cotton after the main crop has been harvested and effective to gather and clean detached cotton lying on the ground or in plant growth near the ground.

Another object of the invention is the provision of new and improved cotton gathering apparatus having means therein for separating out leaves, stalks and other debris and casting it from the apparatus while retaining only substantialy clean cotton.

Another object of the invention is the provision of an improved method of clearing a cotton field of fallen cotton while casting aside substantially all attached foreign matter and debris.

Another object of the invention is the provision of power propelled cotton gathering apparatus adapted to be advanced along rows of cotton and ahead of a supporting chasis for the apparatus and effective to recover cotton on and near the ground not withstanding ground irregularities and the presence of troughs and channels commonly present in cotton fields.

Another object of the invention is the provision of cotton scavenging apparatus capable of procesing multiple rows of cotton and operating to gather the fallen cotton into windrows in advance of pickup facilities effective to retain cotton while rejecting foreign matter.

Another object of the invention is the provision of cotton scavenging apparatus adapted to be advanced lengthwise between rows of cotton plants and utilizing jets of air in combination with rotating brushes and their functional equivalents in dislodging and transferring the cotton from its place of rest into debris separating and cleaning equipment carried by the apparatus.

Another object of the invention is the provision of improved cotton scavenging apparatus embodying automatic means for sensing and immediately rejecting any foreign bodies of a size and nature likely to inflict injury on the cotton cleaning equipment carried by the apparatus and immediately restoring the apparatus to its normal operating condition following purging of the foreign body.

Another object of the invention is the provision of cotton scavenging apparatus adapted to be movably supported across one end of propelling equipment and including provision for raising the recovery equipment proper away from the ground when not engaged in the recovery of cotton and for again restoring it to its normal operating position with respect to the ground at other times.

Another object of the invention is the provision of improved means for supporting and adjusting cotton scavenging equipment with respect to the ground.

Another object of the invention is the provision of cotton scavenging and recovery apparatus providing rotating brushes some of which rotate about generally horizontal axes and others of which operate about generally vertically disposed axes and cooperating with one another to first windrow the cotton and thereafter to lift it into the apparatus proper.

Anoher object of the invention is the provision of cotton cleaning apparatus adapted to clean cotton in the field and including a plurality of toothed cylinders rotating counter to one another and effective to pass the cotton from one to the other while disintegrating and separating debris from the cotton and casting the debris from the apparatus while retaining the cotton.

Another object of the invention is the provision of cotton scavenging apparatus employing rotating brush means for lifting cotton off the ground and into a position to be carried into debris treating equipment carried by the apparatus with minimum risk of stones, grit, heavy stalks, and the like contacting the cleaning equipment.

These and other more specific objects will appear upon reading the following specification and claims and upon considering in connection therewith the attached drawings to which they relate.

Referring now to the drawings in which a preferred embodiment of the invention is illustrated.

*The scavenger apparatus in general*

Figure 1:
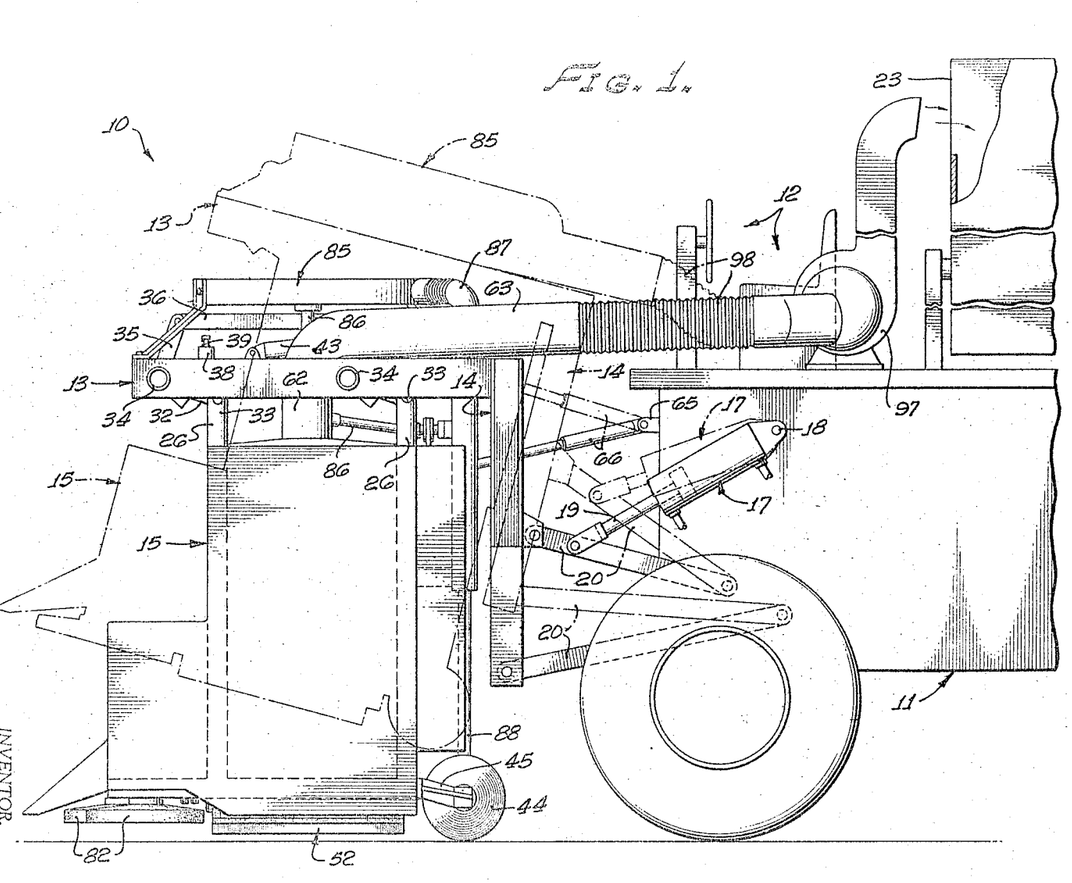
FIGURE 1 is a side elevational view of a preferred embodiment of the scavenging apparatus with portions of the cotton storage receptacle and the propelling power plant broken away, the full line showing representing the position of the parts in cotton gathering position and the dot-and-dash lines showing these parts elevated off the ground.
Figure 2:
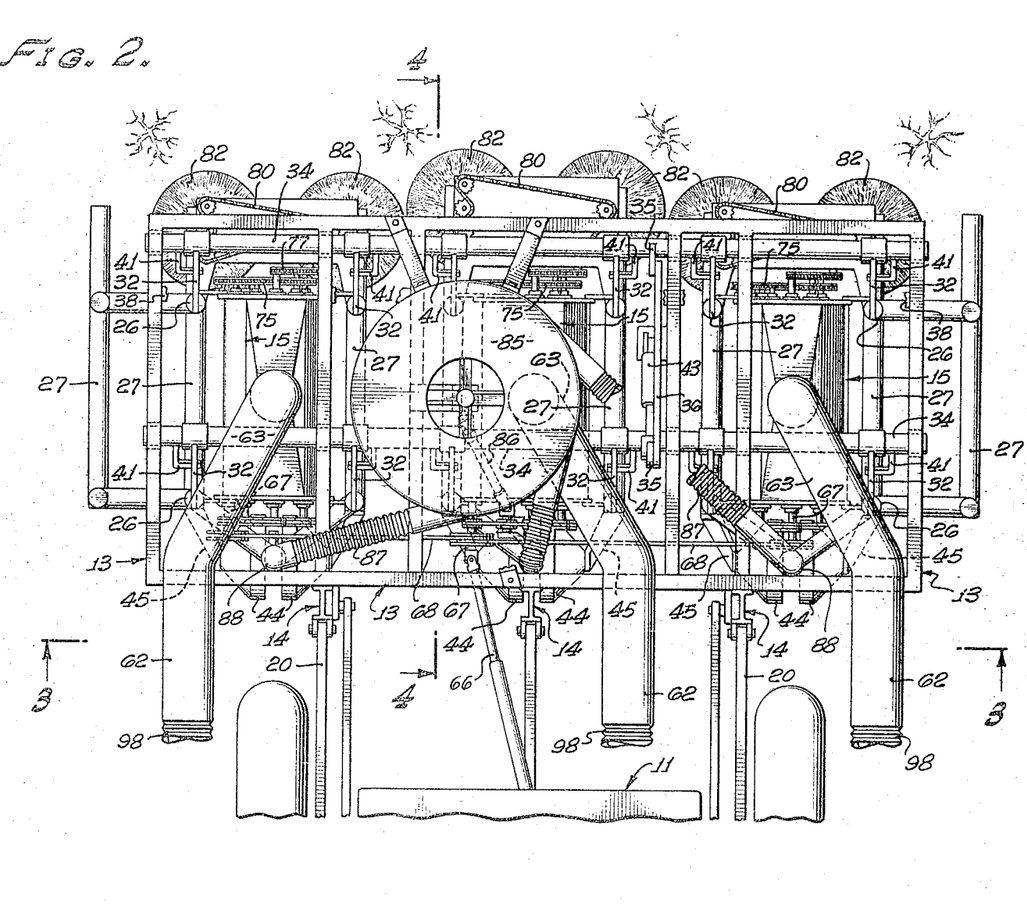
FIGURE 2 is a top plan view of FIGURE 1.
Figure 3:
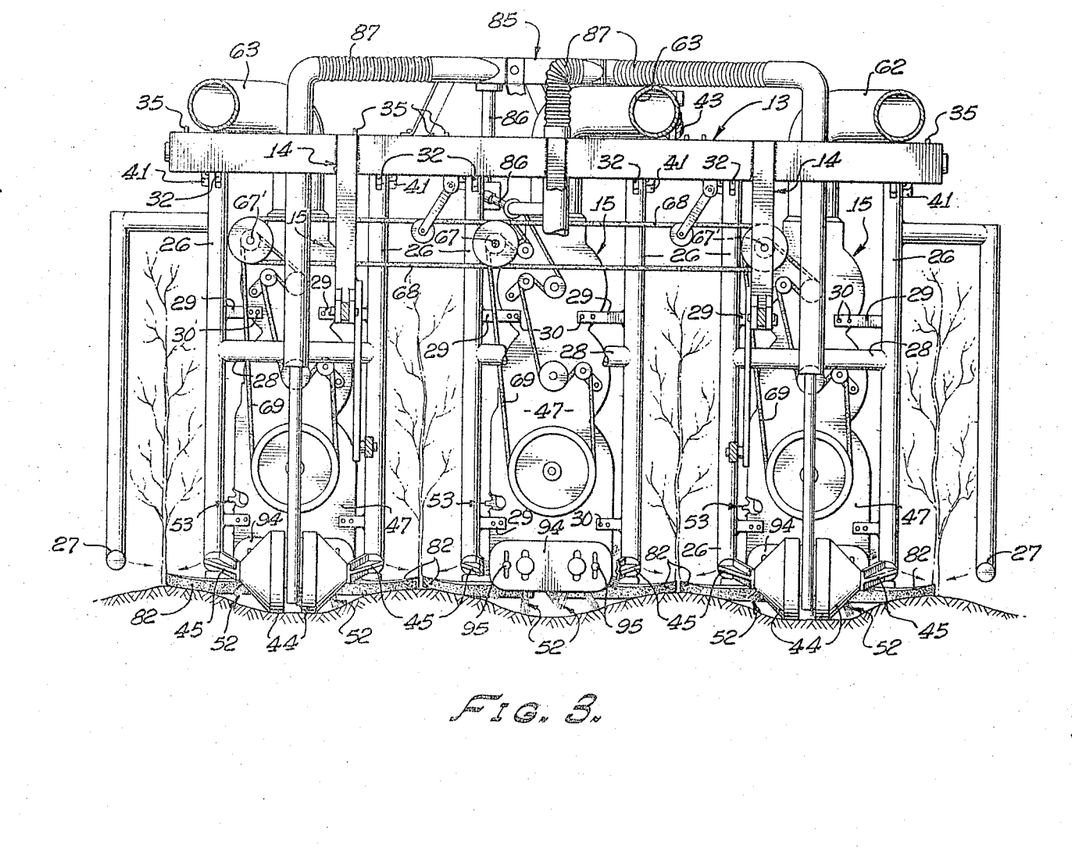
FIGURE 3 is a cross-sectional view along a vertical plane indicated by line 3—3 on FIGURE 2.

Referring more particularly to FIGURES 1, 2, and 3 there is shown a preferred embodiment of cotton recovery and scavenging apparatus according to this invention, the scavenger per se being generally indicated at 10. As shown, this apparatus is mounted across the forward end of a suitable tractor or propelling power plant 11, only the forward end of which is here illustrated and having a driver station 12 atop its forward end.

Recovery apparatus 10 has an inverted L-shaped main frame and includes a generally rectangular horizontally disposed leg 13 and a vertically disposed leg 14 rigidly secured together. Appropriately suspended from horizontal leg 13 in a manner to be described are a plurality of identical cotton recovery units 15, there being three such units illustrated in the present drawing and each located between an associated pair of rows of cotton in the manner illustrated in FIGURE 2. The described unitary main frame of the apparatus is pivotally connected to the forward end of tractor 11 by any suitable operating linkage by which the apparatus can be pushed ahead of tractor 11 as well as raised and lowered between its nonoperating and operating positions. As shown in full lines in FIGURE 1 the cotton recovery units are separately supported in closely spaced relation to the ground by means which will be explained in detail below. When the apparatus is not in use to recover cotton it may be held suspended in an upwardly and forwardly inclined position represented by the dot-and-dash line in FIGURE 1. Raising and lowering of apparatus 10 is controlled by a pair of hydraulic cylinders 17 of which there is one located on either side of the tractor. One end of the cylinder 17 is pivotally connected to the tractor as by pin 18 whereas the outer end of piston rod 19 is pivotally connected to an upper one of the respective pairs of supporting linkage members 20, 20.

It will be understood that each of the recovery units 15, 15 includes rotating sweeper brushes as well as air jetting means cooperating with one another to dislodge the fallen cotton and to sweep it into windrows centrally between a row of cotton plants and in the path of a second set of horizontal axis brushes rotating upwardly toward one another from the opposite sides of the windrow. The latter brushes are effective to lift the cotton off the ground and against the teeth of the lower of several superimposed saw teeth toothed cylinders employed to separate out the debris and cast it from the apparatus. After the cotton has been cleared of debris the clean cotton is carried away, as by suction, and discharged into a clean cotton storage receptacle 23 located on top of tractor unit 11.

With the foregoing general arrangement in mind a detailed description of the apparatus will be given.

*Suspension framework for the cotton recovery units*

The cotton recovery and cleaning units 15 are suspended from the horizontal portion 13 by separate tubular frames each having four upright tubular members 26 (FIGURES 5, 6 and 7) rigidly interconnected transversely of the apparatus by tubes 28 and lengthwise of their lower ends by tubes 27 all rigidly welded together and in communication with one another. It will therefore be recognized that the rigidly welded tubes 26, 27, and 28 form a rigid rectangular framework surrounding each of the recovery units 15 and to which the latter are rigidly but detachably secured in the manner shown in FIGURES 3, 5, and 6. To this end brackets 29 rigidly welded to the upright tubes 26 project toward one another and are secured by cap screws 30, 30 (FIG. 3) to the opposite ends of recovery units 15.

Figure 4:
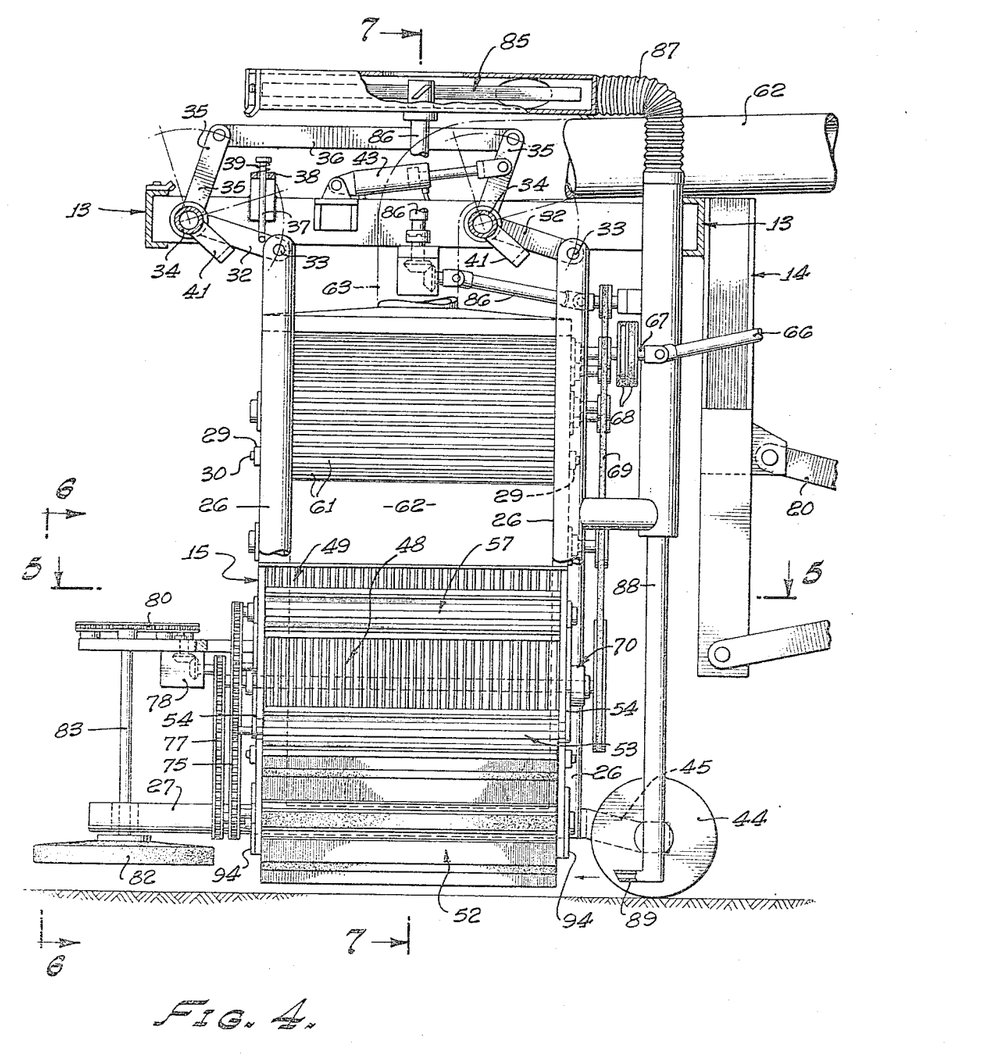
FIGURE 4 is a vertical sectional view taken along line 4—4 on FIGURE 2.

Referring to FIGURES 1, 2 and 4, it will be understood that the bifurcated upper ends of vertical tubes 26 are pivotally connected by pins 33 to arms 32 loosely journaled on tubes 34 extending parallel to one another the full length of main frame 13. These tubes are supported to rotate in journals carried by the frame about their own axes. Rigidly secured to and projecting radially from tubes 34 is a separate arm 35 for each of arms 32, and having certain of their upper ends connected by horizontal links 36 in the manner best shown in FIGURE 4. An L-shaped arm 41 welded to tubes 34 has its transverse leg underlying arms 32 (FIGURE 2) and is effective when shaft 34 is rotated counterclockwise to pivot arms 32 upwardly thereby elevating and adjusting the tubular frames for units 15.

The means for operating the described linkage to raise and lower the frame formed by tubes 26, 27, 28 comprises a hydraulic cylinder 43 having one end pivotally secured to frame 13 and the outer end of its piston rod pivotally connected to one of the arms 35 (FIGURE 4). By admitting pressurized fluid to one or the other end of cylinder 43 it will be evident that arms 35 and links 36 can be rotated clockwise or counterclockwise to the extent necessary to adjust the position of the scavenging units relative to the ground. If desired, this adjusting mechanism can be locked in any desired position by closing the valve supplying pressurized fluid to the opposite ends of the piston in cylinder 43 thereby holding the fluid trapped on either side of the piston.

The foremost end of the cotton units 15 are desirably supported resiliently by spring means and including a rod 37 having a hooked end socketed in each of forward ones of arms 32 as illustrated in FIGURE 4. The upper end of this rod passes loosely through a hole in a bracket 38 carried by frame 13 and a strong torsion spring 39 held captive between the top of this bracket and the capped upper end of rod 37. Under certain operating conditions the valves supplying pressurized fluid to cylinder 43 are left open and the fluid is free to enter and leave the cylinder at will. Under these conditions springs 39 are effective to provide considerable resiliency and a spring support for the floating front end of the cotton recovery units 15.

As will be appreciated from the foregoing description of the suspension and height adjusting means for units 15, it is a matter of the operator's choice whether he wishes to lock the recovery units substantially against movement by maintaining pressurized fluid on both sides of the piston in cylinder 43 or whether he wishes to allow fluid to flow freely into and out of the cylinder as the recovery units held in suspension by the relatively stiff springs 39. Inasmuch as these springs support a considerable portion of the weight of the forward end of the recovery units it will be apparent that they provide considerable assistance in aiding elevation of the units 15 above the ground either by cylinder 43 or the main lifting cylinders 17 on the tractor.

As herein shown a single cylinder 43 serves to operate the raising and lowering mechanism for the bolted ends of each of the pickup units 15. It will, of course, be appreciated that if desired each unit may be provided with a separate power operating cylinder and that each of these cylinders may have its own set of control valves. In the usual case, however, ground used in growing cotton is maintained unusually level and it is therefore expedient and advantageous to employ a common operating cylinder for raising and lowering all cotton recovery units simultaneously.

The rear or trailing ends of each of units 15 are supported in part by a pair of frusto-conical rollers 44 having their larger ends closely spaced apart and supported on brackets 45 bolted or otherwise rigidly secured to the lower ends of tubes 26 in the manner illustrated in FIGURES 3 and 4. The adjacent inner ends of rollers 44 are arranged to ride in the bottom portion of the irrigating furrow between the rows of cotton plants and provide assurance that the inlet ends of pickup units 15 are appropriately positioned with respect to these furrows and the windrowed cotton.

*Construction of the individual cotton recovery units*

The identical cotton recovery and cleaning units 15 will now be described by reference to FIGURES 3 to 7. It will be understood that each of these units has imperforate end walls 47 across their forward and rear ends held assembled by any suitable cross bracing. Rotatably supported between these end plates are toothed cylinders 48, 49, 50. The two lower cylinders 48, 49 have hooked teeth in closely spaced rings whereas the teeth on the upper or doffer cylinder 50 have substantially radially disposed forward edges incapable of retaining cotton against centrifugal action. Once the hookshaped teeth of the two lower cylinders engages strands of cotton the cotton tends to remain firmly engaged with the teeth until detached by some removing force. It will be observed from FIGURE 7 that the teeth of upper cylinders 49 and 50 are disposed substantially tangentially to one another and sufficiently close that cotton impaled on the teeth of lower cylinder 49 is easily transferred to the faster rotating teeth of upper cylinder 50.

Rotatively supported below lower cylinder 48 is a pair of brush rolls 52 provided with rows of bristle tufts spaced sufficiently from one another circumferentially of the rolls to permit interleaving of the tufts of the two rolls. To this end the brush rolls are driven in out-of-phase relation so that the tufts of one brush can interleave between a pair of tuft rows of the other brush roll with a minimum of interference. As shown, there are eight rows of tufts but it will be understood that a lesser number may be employed.

Figure 6:
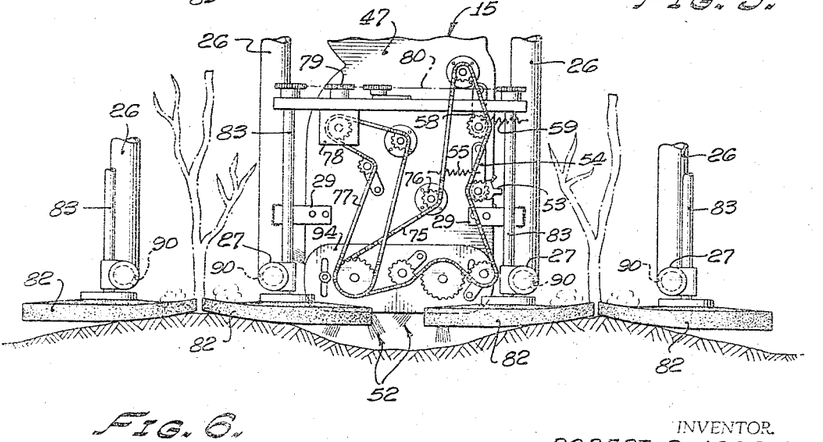
FIGURE 6 is a fragmentary front elevational view of the same cotton recovery unit shown in FIGURE 5 and taken along line 6—6 on FIGURE 4.

The two brush rolls are supported in bearings adjustably secured to mounting plates 94 (FIGURE 3) at either end of units 15 and are so adjusted that the lower ends of the tufts operate close to but out of actual contact with the ground. Suitable driving means for these rolls to be described below operate to drive the brushes in opposite directions, the one on the right in FIGURE 7 rotating clockwise and the other rotating counterclockwise. For this reason it will be appreciated that a windrow of cotton disposed in the bottom of the irrigating channel and centrally between these brush rolls is positioned to be lifted by the brush tufts and delivered upwardly against the teeth carried by cylinder 48. This cylinder is driven counterclockwise as indicated by the arrow thereon and the cotton and other material impaled on its teeth is carried into engagement with the lower beater or destructor roll 53 of a conventional construction well known to persons skilled in the cotton cleaning art and rotatively supported at its end on the lower ends of supported arms 54. This mounting represents an important feature of the invention, the upper ends of these arms being journaled in end plates 47 of unit 15 urged to swing toward cylinder 48 by light tension springs 55 (FIGURE 6). These springs normally hold the beater rolls 53 in the position shown in FIGURE 7 and against unshown stops to control the narrow gap between the outer ends of the beater blades and the teeth of cylinder 48 throughout the length of this cylinder.

The described pivoting arrangement for beater 53 is of considerable importance for reasons which will become evident from the following explanation. Thus the bristles in brushed tufts or rolls 52 must have sufficient stiffness and density to be effective in performing their function of dislodging semiburied cotton from the ground, lifting it into engagement with cylinder 48. It not infrequently happens that these rolls will pick up foreign bodies along with the cotton such as stones or pieces of wood or the like which may have been floated into the irrigation ditches. If such foreign material were allowed to be carried into the cleaning apparatus serious damage to the teeth and other components of the cleaner would result.

These possibilities are positively safeguarded against by reason of the construction and mode of operation of beater 53. Should such foreign material be lifted into engagement with cylinder 48 by the brush rolls it will be carried immediately into the path of the counter rotating beater roll 53. In many instances this beater operates to discharge such foreign material from the apparatus by flinging it outwardly and downwardly to the right as viewed in FIGURE 7. In other cases, however, the higher operating speed of cylinder 48 carries the foreign material into the gap between the beater roll and the saw teeth. Immediately that this happens the movement of the foreign material into this gap acts to pivot the beater roll and supporting arms 54 outwardly away from cylinder in opposition to the action of the tensioning springs 55, 55 and as indicated by the dotted line showing of the beater in FIGURE 7. The provision made for swinging the beater roll away from the saw cylinder is fully adequate to by-pass the largest foreign material capable of being carried into the apparatus by brush rolls 52 and it is thereupon immediately cast from the open side of units 15. Immediately that the material is expunged, springs 55 return the beater roll to its normal operating position against the stops for arms 54 which may comprise adjustable cap screws provided with jam nuts. The springs are sufficiently light in duty as to permit the beater to swing away from the cylinder teeth under the influence of any foreign object large enough to risk damaging of the teeth if permitted to be carried further into the cotton cleaning unit.

Cylinder 48 is rotated somewhat faster and counter to beater 53, 90 r.p.m. for the cylinder and 55 r.p.m. for the beater being typical speed and quite effective. The counter rotating beater is highly effective in rejecting much of the debris and foreign material being carried upwardly by cylinder 48. Other of the foreign material contacted by beater 53 is fragmented and broken into smaller pieces many of which are discharged by centrifugal action after passing beyond the upper side of beater 53.

A second beater or destructor roll 57 is positioned almost directly above beater 53 opposite the gap between cylinders 48 and 49. This beater is also suspended between the lower ends of swinging support arms 58 likewise pivotally supported on end plates 47 in the manner shown in FIGURE 6 and spring biased to the right as viewed in that figure by light tension springs 59. One of the primary functions of these springs is to maintain proper tension on the drive chain belt for the beaters and other components of the unit and the details of which will be described presently. Suitable stops are provided for arms 58 and effective to prevent the radial fins of the beater roll from contacting the teeth of either cylinder 48 or 49. Normally a slight gap is always present between the outer ends of the beater blades and the cylinder teeth. An appropriate clockwise speed for beater 57 is 75 to 100 r.p.m. and, like beater 53, it functions to crush, break and fragment debris entangled with the cotton and to dislodge these as well as dirt and granular matter from the cotton. The major portion of such discard is discharged from the top side of beater 57 or is thrown generally horizontally between the two cylinders and outwardly through the left side of units 15. Cylinders 48 and 49 are sufficiently close together that cotton carried by the lower cylinder 48 is easily transferred to the faster rotating teeth of upper cylinder 49 and the same is equally true as respects to the transfer of cotton cylinder 49 and doffer cylinder 50.

The teeth of doffer cylinder 50 have substantially radial forward edges incapable of retaining the cotton against centrifugal forces operating on cotton present on this cylinder which is preferably operated at about 500 r.p.m. Intermediate cylinder 49 operates effectively at 350 r.p.m.

The left hand lateral face of cylinder 49 and the right hand lateral face of doffer cylinder 50 are preferably embraced by arcuate sets of similarly constructed grid assemblies comprising a plurality of parallel rods 60, 61 extending horizontally and supported in arcuate end retainer members suitably secured to end walls 47, 47. These bars are sufficiently close together to retain the cotton while permitting debris and foreign matter to be discharged therepast under the considerable centrifugal forces operating in the upper portions of the cleaner. The opposite lateral sides of both upper cylinders are desirably closed by imperforate covers 62, 62, although it will be understood that grid bars similar to bars 60, 61 may be used in lieu of these imperforate covers if one wishes. The space about doffer cylinder 50 is enclosed and opens into a duct 63 maintained at sub-atmospheric pressure by a suction fan 97 (FIGURE 1) adequate to convey the cleaned cotton discharging from the doffer cylinder upwardly and into storage basket 23 (FIGURE 1). The suction air stream, entering via grid bars 61 and otherwise, aids in dislodging the cleaned cotton from the teeth and in separating it from remaining fragments of debris discharging through grid 61.

*Power drive between tractor and scavenger*

Driving connections between tractor 11 and scavenger 10 include a power take-off unit 65 located at the forward end of the tractor. This take-off includes suitable universal connections and a telescoping drive shaft 66 (FIGURE 1) suitably journaled on the main frame of unit 10 (FIGURES 3, 4). Separate pulleys and drive belts 68, 68 interconnect main drive shaft 67 (FIGURE 2) with the similarly disposed drive shafts 67 for each of the two outboard pickup and cleaning units 15 (FIGURE 3). V-belts of usual construction are suitable for this purpose. Additional similar V-belts 69 embracing drive pulleys and idlers located exteriorly of the rear end wall 47 of each of the several units function to drive each of the toothed cylinders 48, 49, 50. The individual drive pulleys for each of these cylinders are of appropriate diameter and suitable for driving each at the different respective speeds mentioned above.

Figure 5:
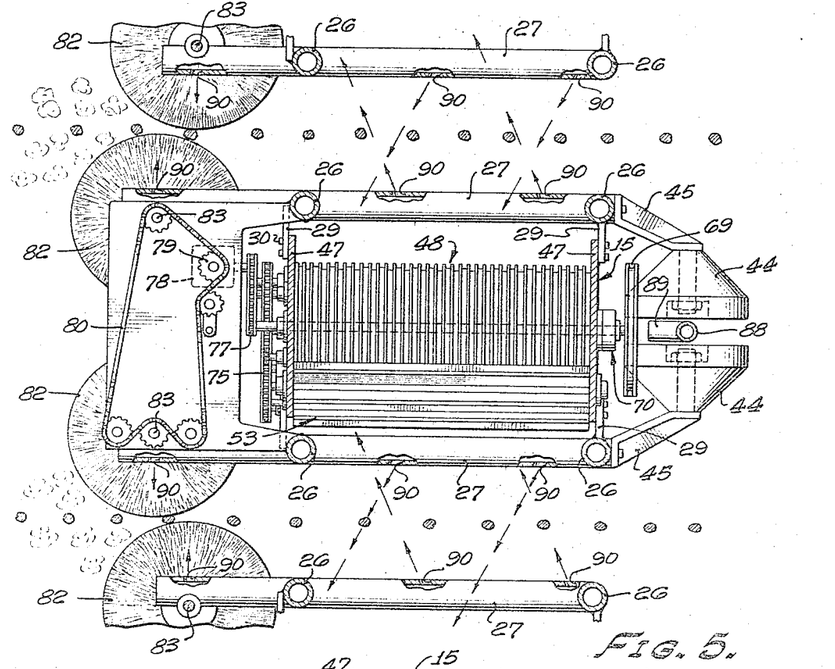
FIGURE 5 is a fragmentary transverse view through one of the cotton recovery units taken along the horizontal plane indicated at 5—5 on FIGURE 4.

Referring to FIGURE 5 it is pointed out that the power drive between belts 69 and the shaft for the lowermost cylinder 48 of each cotton cleaning unit includes any suitable conventional type of slip clutch 70 (FIGURE 4) which is normally closed but is set to open at any selected load deemed to be in excess of a safe limit. If this limit is exceeded the clutch opens and discontinues the drive to all brushes and to beaters 53, 57 and to lower cylinder 48 until a safe operating condition has been restored. This disconnect and restoration of the disconnect occurs automatically and provides important operating advantages to be explained in greater detail below.

Referring now to FIGURES 4, 5, and 6, it will be understood that the power drive for beater rolls 53, 57 and for all brushes is located at the advance end of units 15 and is derived from the driven shaft for lower cylinder 48, positive drive chains being used in lieu of the V-belts 68, 69 at the rear ends of units 15. Three separate chains are employed, the main drive being chain 75 engaged with main drive sprocket 76 secured to the forward end of the shaft for cylinder 48. Chain 75 passes over a sprocket driving upper beater 57 and downwardly over a sprocket secured to lower beater 53 and then over sprockets driving each of pickup brush rolls 52, 52. Drive chain 77 receives its power from the sprocket secured to the left hand brush roll 52 and drives miter gears housed within housing 78 enclosing and having a vertically disposed output shaft supporting a driven sprocket 79 (FIGURES 5, 6). The latter sprocket drives the third chain 80 supplying power to drive a pair of pancake type sweeping brush rolls 82, 82 mounted at the lower ends of vertically disposed shafts 83. Relatively stiff long bristles of the latter brushes are disposed to sweep cotton, even though partially embedded in dirt, and to dislodge any cotton from the grass and weeds, and carry it into a windrow generally centrally of the irrigation ditch. Desirably the pairs of sweeper brushes 82 are arranged in echelon as indicated in FIGURES 2 and 5 and such that their bristles may overlap and extend beyond the stalks of the cotton plants in each row. In this manner assurance is provided that all parts of the ground will be agitated either by sweeper brushes 82 or by pickup brushes 52. Preferably, each pair of co-operating brushes 82, 82 rotate counter to one another and in a manner to carry the dislodged cotton into the described windrows in readiness to be picked up by brushes 52.

To avoid excessive wear of the bristles in brushes 82, these are desirably disposed slightly above or only in light brushing contact with the top surface of the dirt about the faces of the cotton plants. It is not essential that any of the bristles actually bear against the ground since close proximity of the lowermost bristles to the ground taken with the current created by their rotation is found highly effective in recovering even partially embedded cotton and transferring it into a windrow.

Additional features of importance include appropriately disposed jets of air directed to sweep the ground and to aid in sweeping loose cotton into the path of the pickup brushes. To this end the apparatus is provided with a suitable source and volume of pressurized air such as air blower 85 overlying the top of the main frame and connected to a driving jack shaft drive mechanism 86, 86 best shown in FIGURES 2, 3 and 4. This shaft is coupled to be driven from the main power take-off shaft 66 in any appropriate manner. The large volume of pressurized air provided by blower 85 is channeled through flexible ducting into the interior of the tubular main frame components 26, 27 for each of the cotton cleaning units 15.

A portion of the pressurized air is also channeled through a vertical distributing duct 88 (FIGURE 4) opening through forwardly disposed nozzles 89 (FIGURE 4) positioned between each pair of rollers 44, 44 (FIGURE 5) and directed against the rear end of each windrow of cotton. Accordingly it will be understood that the air issuing from nozzles 89, 89 continually sweep the windrowed cotton toward sweeper brushes 82 and along the channel between the lower portion of brushes 52 causing it to pile up between the pickup brushes and to be carried upwardly into the cleaner and debris separator equipment. It will also be evident that these air nozzles maintain the cotton piled sufficiently high for the pickup brushes to be highly effective in lifting the cotton against lower cylinder 48.

Figure 7:
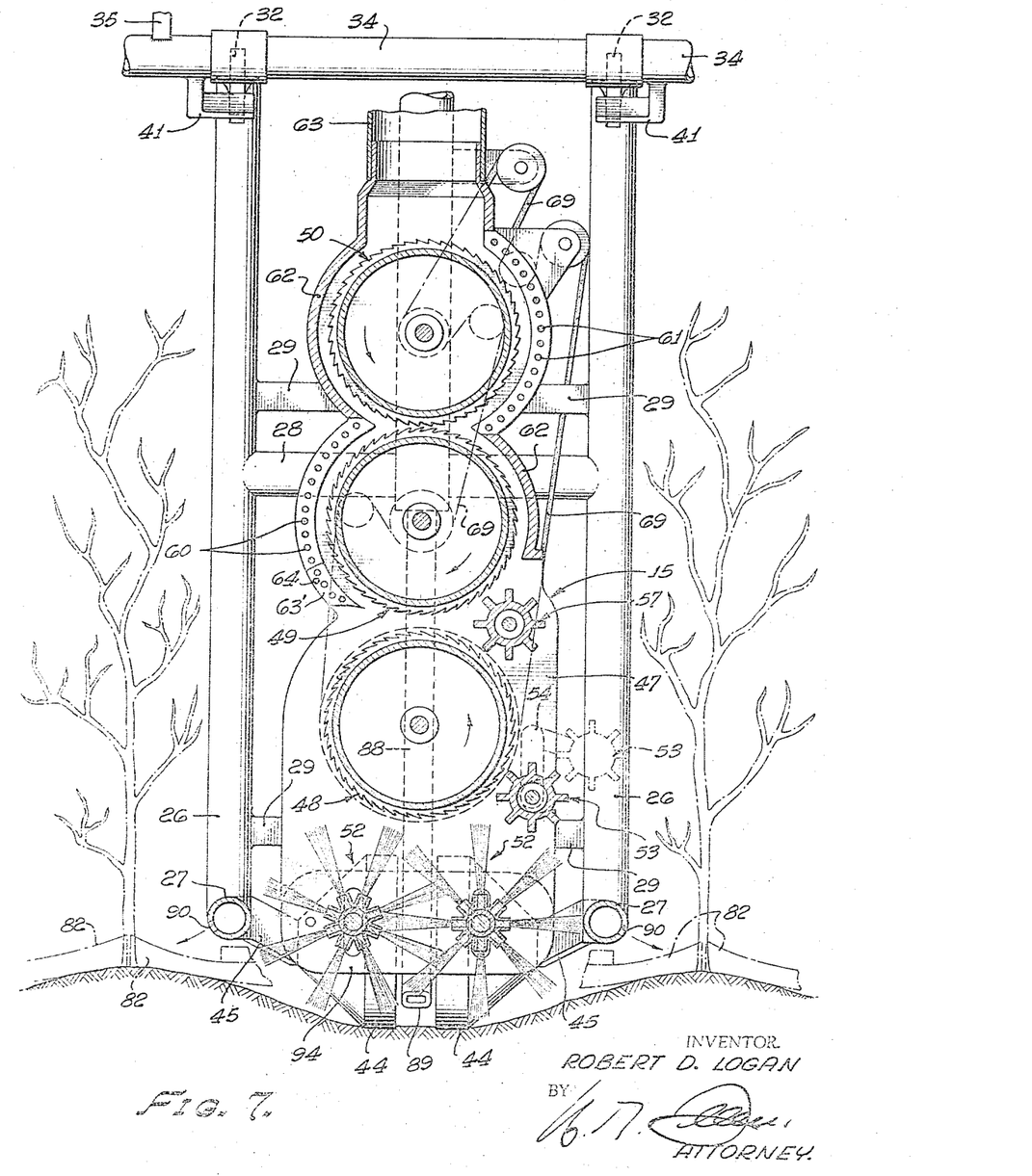
FIGURE 7 is a transverse vertical sectional view taken along line 7—7 on FIGURE 4.

As is made clear by FIGURES 5, 6 and 7 other portions of the pressurized air are carried along the horizontally disposed tubular frame members 27 and through ports or nozzles 90 so positioned and directed as to direct relatively high velocity jets of air across the rows of cotton plants at an angle and in the direction clearly indicated by the arrows in FIGURE 5. The air jets cross one another at different elevations and are so disposed as to sweep the ground clear of any cotton not otherwise recovered and carrying it into a position to be picked up by brush rolls 52. To be noted from FIGURES 2 and 3 is the fact that two of the air directing pipes 27, 27 are arranged as outriggers positioned laterally beyond the exterior sides of the two outermost rows of cotton plants. These particular pipes have air nozzles or jets directed inwardly only and are effective to sweep any fragments of cotton toward the adjacent ones of the brush rolls.

Other miscellaneous features of significance include means for adjusting the components for wear and particularly pickup brushes 52. Referring to FIGURE 3, it is pointed out that the brush rolls are journaled in a plate 94 mounted along the lower edge of either end plate 47 of the pickup units. Each of the plates 94 is also provided with a pair of slots supporting clamping bolts 95 by which plates 94 can be shifted vertically and tightened to maintain the proper spacing between the ends of the brush tufts in rolls 52 and the lower side of cylinder 43 thereby compensating for both wear and manufacturing tolerances. It will also be understood that similar or equivalent adjusting means may be provided at various points in the apparatus to permit proper relative positioning of all components for most effective operation.

Additional details of the linkage connecting scavenger unit 10 to tractor 11 will now be described by reference to FIGURE 1. Thus it will be understood that each side of the tractor is provided with a pair of horizontally disposed links 20 each having its rear end pivotally connected to the side of the tractor and its forward end pivotally connected to the vertical leg 14 of the scavenger main frame. The solid line positions of links 20, 20 show the scavenger in its normal operating position whereas elevated position of these links is indicated by dot-and-dash lines. In their normal operating position rollers 44, 44 of each of the scavenging units 15 rest on the ground and support a substantial portion of the weight of scavenger 10, the remaining portion being carried by links 20, 20 and cylinders 17.

It will be understood that the tractor is provided with a conventional hydraulic system together with controls arranged conveniently to the driver at station 12 and by which the flow of pressurized fluid to the opposite ends of cylinders 17 and 43 can be controlled and regulated as desired. Mounted on tractor 11 is a suction fan 97 having a flexible duct connection 98 with suction pipe 63 and arranged to be driven by the tractor. This fan is employed to convey the clean cotton from each of the separator units 15 into storage receptacle 23 supported on the tractor.

*Operation*

While maneuvering the described apparatus into position to recover loose cotton from the ground, scavenger 10 is supported in the retracted position indicated in dot-and-dash lines in FIGURE 1. Once the apparatus has been aligned with the rows down which it will travel, the operator lowers the recovery equipment by extending cylinders 17 until rollers 44 rest on the ground in the bottom of the irrigation ditches. Control equipment readily accessible at driver's station 12 is then manipulated to activate the power take-off and drive the telescopic shaft 65. This operates in the manner described above through belts 68, 69 (FIGURE 3) to drive all components of each of the recovery units 15, 15 as well as blower 85. Suction fan 97 is also placed in operation to apply suction to the interior of each of the units through ducts 62.

When the equipment is fully retracted, cylinder 43 (FIGURE 4) will normally be in retracted position to hold tubular frames 26, 26 for each of the recovery units fully retracted. The adjusting range available through cylinder 43 is indicated by the dot-and-dash lines applied to arms 32 and 35 in FIGURE 4 and representing the approximate range of movement of these arms. It will be understood that cylinder 43 provides a fine adjustment for regulating the height of sweeping brushes 82, pickup brushes 52, and the various air nozzles with respect to the ground being swept, whereas cylinders 17 located on the tractor provide a rougher type of adjustment. The service life as well as the operating efficiency of brushes 52 and 82 can be greatly extended and their effectiveness improved if units 15 are so supported that both sets of brushes have little or no contact with the ground.

As is made clear by FIGURE 3, the individual cotton cleaning and recovery units 15 are located between adjacent rows of cotton plants. The three units shown are therefore effective to simultaneously gather loose cotton from between the cotton plants of adjacent rows. Inasmuch as the horizontally disposed large diameter brushes 82 are located across the forward end of the apparatus, these brushes serve to gather the major portion of the loose cotton and to sweep it clear of the plants and of the ground and into a windrow located centrally of the irrigation channel and between the associated rows of cotton plants. This gathering operation is associated and augmented by the jets of air issuing from nozzles 90 along the outer side of the tubular frame members 27 as is made clear by FIGURES 3, 5 and 7. The jets issuing from ports 90 are so directed as to crisscross one another across an intervening row of cotton plants. Although the jets appear to impinge against one another in FIGURE 5, it will be understood that actually this is not the case since they are located at different levels at points of crossover. The axis of the individual jets are disposed in slightly different planes and so as to sweep across the ground slightly above its surface in order to avoid raising dust and yet sweep loose cotton not picked up by sweeper brushes 82 into the brushes. Since the individual elements of brushes 82 are sufficiently long as to extend beyond the stalks of the cotton plant, assurance is provided that the entire width of the ground will be swept as the apparatus passes along the field.

The windrowed cotton lying in a pile centrally of the irrigation channel is picked up by the counter rotating brushes 52 and discharged against the underside of the toothed cylinder 48. The rings of saw teeth carried in closely spaced relation along the length of this cylinder disengage the cotton from the brushes and carry it impaled on the teeth upwardly past lower beater 53. The latter operates in the manner described above to fragment the dry brittle material into smaller bits and to fling it downwardly and outwardly to the right as viewed in FIGURE 7. Other of the debris not dislodged by beater 53 remains attached to the cotton by-passing this beater and comes into contact with overlying beater 57. The latter is rotating in a direction to throw the debris against the saw teeth and to break into small pieces further portions of the foreign matter. Any portions thrown into the space between cylinders 48, 49 are cast outwardly and to the left through the throat between these cylinders. To be observed from FIGURE 7 is the fact that the lower edge portion 63' of grid 60 is separable and held attached to overlying portions of the grid by assembly bolts 64. These may be adjusted to vary the gap between the bottom edge of grid 60 and cylinder 48 to avoid loss of cotton past this gap.

Cotton present on the teeth of cylinder 48 is readily transferred to the faster rotating cylinder 49 and carried upwardly along with certain smaller fragments of the debris. This debris is passed into contact with bars 60 and thereby further broken up and cast to the ground past these bars. Substantially fully cleaned cotton is transferred from the teeth of cylinder 49 to the differently designed teeth of doffer cylinder 50. Small portions of additional debris are centrifugally thrown from this cylinder and through the spaces between grid bars 61. Owing to the radial edges of teeth 50, cotton is easily centrifugally separated from these as the teeth rotate past the inlet end of suction duct 63. The removal of cotton from the doffer teeth is assisted by air flowing upwardly into duct 63 and is carried through the fan and discharged into the receptacle 23.

Foreign objects of a size likely to cause injury to the components of the pickup unit 15 are automatically discarded by the action of lower beater 53. As was explained above, this beater is held against stops by the spring 55 (FIGURE 6) and normally operates in the position shown in FIGURE 7. However, should any foreign matter tend to pass between this beater and cylinder 48, springs 55 permit the beater to swing outwardly about an axis through the upper end of supporting arms 54. After the foreign matter has been discarded the springs immediately return the beater to its normal operating position.

It is pointed out by reference to FIGURE 4 that high efficiency recovery of the windrowed cotton is greatly assisted by the action of the nozzles 89 positioned between each pair of rollers 44. The strong jets of air issuing in a forward direction from these nozzles is directed against the rear end of the windrow and serves continually to roll the end of the windrow forwardly into engagement with the pickup brushes. These nozzles are highly effective in assuring that the cotton is carried into the paths of the rotating brush tufts and is maintained in a pile of sufficient height to be readily engaged by these tufts.

It sometimes happens that a large glob of cotton is picked up and delivered against lower saw 48. When this occurs jamming tends to occur between beaters 53, 57 and lower cylinder 48. Whenever this happens the additional load on pickup brushes 52 and the beaters exceeds the power transmitting capabilities of slip clutch 70. Accordingly, cylinder 48 as well as the brushes cease to rotate while the upper cylinders 49, 50 continue to operate and to process cotton thereon. Clutch 70 remains disengaged only for the very brief period required to clear cotton from the upper cylinders, whereupon it recloses to resume the drive to the sweeping and pickup brushes.

When the operator reaches the end of one set of rows, it is usually desirable to lift units 15 sufficiently above the ground to avoid risk of injury to the brushes while maneuvering the equipment into alignment with the next rows to be swept. Normally it is sufficient merely to employ cylinder 43 (FIGURE 4) to operate arms 35 and link 36 in a direction enabling the L-shaped arms 41 to engage the lower side of arms 32 and to lift units 15 a few inches above the ground. This lifting action can be supplemented if desired by operation of main lifting cylinders 17 carried by the tractor but normally this is not necessary. Once the equipment has been aligned with the new rows, the apparatus is lowered and cylinder 43 is adjusted to bring the sweeper brushes into the proper operating position as described above.

Although the various rotating components have been described as operating at a particular speed, it will be understood that these speeds may be varied over a considerable range and as found most effective and efficient under the particular operating conditions in a given field by use of sprockets and belt pulleys of appropriate diameters. Adjustment of the cylinders and of the various rolls toward and away from one another is accomplished by the use of any suitable bearing adjusters the details of which are not shown here but are well known to those skilled in the machine art. Should any unit 15 require servicing or replacement it is quickly detached as a unit from the tubular frames 26, 27 by removing mounting cap screws 30, 30. A substitute unit can then be quickly installed in place of the defective unit.

While the particular cotton scavenger herein shown and disclosed in detail is fully capable of attaining the objects and providing the advantages hereinbefore stated, it is to be understood that it is merely illustrative of the presently preferred embodiment of the invention and that no limitations are intended to the details of construction or design herein shown other than as defined in the appended claims.

I claim:

1. Apparatus for salvaging cotton from the ground comprising, a main frame including means for supporting the same for advance between rows of cotton plants, cotton cleaning means mounted on said main frame including debris destructor means and a plurality of rotary toothed cylinders arranged in superimposed relation to one another and effective to transfer cotton upwardly while the associated debris is being broken apart and rejected from the apparatus, said debris destructor means rotating in opposition to and closely beside said toothed cylinders and effective in cooperation therewith to break leaves, stalks, and the like into bits and to cast them away from cotton engaged with teeth of said toothed cylinders, and means underlying said main frame effective to sweep cotton from the ground and including means for elevating the cotton from the ground and casting the same upwardly against the teeth of the lowest one of said toothed cylinders.

2. Apparatus for separating leaves, stalks and other debris from cotton salvaged from the ground comprising a main frame, a plurality of counter-rotating cylinders supported in closely spaced parallel relation provided with teeth about their respective peripheries, means driving said cylinders, rotary beater means extending parallel to and closely spaced to certain of said toothed cylinders and effective to engage debris carried into said apparatus along with cotton and to break said debris into small pieces while propelling the same away from said cylinders and out of said apparatus, and means supporting one of said rotary beater means for bodily movement laterally away from the adjacent one of said toothed cylinders to by-pass a foreign object too large to pass easily between juxtaposed portions of said beater means and said last mentioned toothed cylinder.

3. Cotton salvaging apparatus for use in cotton fields to gather and treat cotton which has fallen to the ground, said apparatus comprising a wheeled main frame designed to be advanced along rows of cotton plants, a plurality of toothed cylinders mounted in closely spaced parallel relation and including means for driving the same at different speeds, rotary debris destructor means supported in closely spaced relation to the peripheries of at least certain of said cylinders and effective to detach debris carried in cotton engaged with teeth of said cylinders and to break the same into pieces while propelling said pieces away from the cotton and casting them out of said apparatus, means including rotating flexible means for transferring cotton from the ground and against teeth of one of said toothed cylinders, and means for removing cleaned and treated cotton from said toothed cylinders for transfer into receiving means for cleaned cotton.

4. Cotton salvaging apparatus as defined in claim 3 characterized in that said means for transferring cotton from the ground includes a pair of counter-rotating brush rolls arranged to intermesh with one another in a zone closely spaced beneath said toothed cylinder nearest the ground and effective to pick up cotton from the ground and to discharge the same against the teeth of said last mentioned toothed cylinder.

5. Cotton salvaging apparatus as defined in claim 3 characterized in that said means for transferring cotton from the ground includes brush-like means carried by said frame for rotation about an upright axis, said brush-like means being effective to sweep cotton on the ground or lodged in foliage near the ground into a windrow extending between the rows of cotton plants and in the path of advance of said cotton salvaging apparatus.

6. Apparatus for salvaging cotton which has fallen from rows of cotton plants and lies on the ground or is lodged in weeds and grass near the ground, said apparatus having a wheeled frame having a power source, means connecting said power source to a pair of brush rolls supported from said frame on upright axes, said brush rolls being disposed between two adjacent rows of cotton and having long flexible radially-disposed bristles lying generally parallel and in sweeping relation to the ground and their ends wiping crosswise of foliage and of stalk portions of cotton in an associated one of said rows thereby to sweep loose cotton therefrom and into a windrow extending between said rows of cotton, and separate means energized from said power source for elevating the windrowed cotton upwardly into said apparatus as the same advances along the windrow.

7. Apparatus as defined in claim 6 characterized in that said cotton elevating means includes a pair of long counter-rotating brushes connected to said power source and located one to either side of the windrowed cotton and cooperating to elevate the cotton therebetween.

8. Apparatus as defined in claim 6 characterized in the provision of air jetting means positioned opposite the rear ends of said counter-rotating brushes and therebetween and effective to blow cotton in said windrow longitudinally thereof and in the direction of advance of said cotton salvaging apparatus.

9. Apparatus as defined in claim 6 characterized in that said cotton elevating means includes air jetting means located near the rear end of said apparatus and directed to sweep cotton forwardly along the windrow thereof to assure recovery of the windrowed cotton, and guard means positioned to either lateral side of said air jetting means.

10. Apparatus as defined in claim 9 characterized in that said guard means includes a pair of closely spaced wheels positioned one to either side of said air jetting means and serving to support the rear end of said apparatus.

11. Apparatus for salvaging cotton which has fallen from rows of cotton plants and lies on the ground or is lodged in weeds and grass near the ground, said apparatus having a main frame adapted to be pulled along and between adjacent rows of cotton, a plurality of cotton sweeping devices at the forward end of said main frame cooperating to sweep cotton from the ground and from foliage in which it may be lodged into a windrow extending lengthwise between said rows of cotton, said cotton sweeping covering the full width between said adjacent rows of cotton and a narrow width of the ground on the outersides of said cotton rows, air jetting means at the rear end of said frame positioned to blow the windrowed cotton forwardly lengthwise of the windrow, means to either side of said windrow for elevating the cotton upwardly and including means spaced substantially above the windrowed cotton for capturing the cotton and retaining the same on said apparatus.

12. Apparatus as defined in claim 11 characterized in the provision of power driven means on said apparatus effective to sense the presence in the elevated cotton of a foreign object larger and heavier than cotton and cotton stalks and effective to cast such foreign object out of the apparatus.

13. Apparatus as defined in claim 11 characterized in the provision of air nozzles supported on said frame and located on the outer sides of the rows of cotton along which the apparatus is advancing, said air nozzles being directed inwardly toward the windrowed cotton and positioned to supplement said cotton sweeping means in gathering loose cotton into a windrow.

14. Apparatus as defined in claim 11 characterized in that said means to either side of said windrow for elevating cotton comprises a pair of brush rolls driven in opposite directions and operating close to but substantially out of contact with the ground, said air jetting means being directed forwardly through the rear end of the gap between said brush rolls near ground level and serving to sweep the rear end of the windrowed cotton forwardly and to facilitate its efficient pick-up by said brush rolls.

15. Apparatus as defined in claim 14 characterized in that said cotton sweeping devices comprise brushing means rotating in opposite directions and in a manner to sweep cotton from either side of the strip of ground between two rows of cotton into a windrow centrally of the strip, said sweeping devices being positioned forwardly of said brush rolls.

16. Apparatus as defined in claim 14 characterized in that said brush rolls are provided with a plurality of rows of flexible bristles extending lengthwise thereof, means supporting said brush rolls with said rows of bristles overlapping one another along their near sides, said brushes normally operating with the overlapping bristle ends out of contact with one another but cooperating to elevate cotton therebetween.

17. Apparatus as defined in claim 16 characterized in the provision of a rotating cylindrical roll provided with rings of saw teeth about its periphery, said cylindrical roll being supported on said apparatus closely adjacent the upper sides of said brush rolls and so as to receive cotton discharging from between the latter.

18. Apparatus for salvaging cotton from the strip of ground between adjacent rows of cotton plants as the apparatus is advanced along said strip, said apparatus having a frame supported at its rear by a pair of closely spaced wheels designed to advance along the irrigating channel normally extending along the center of the strip, means for adjusting said frame and wheels vertically to vary the spacing between the ground and said frame, means on said frame for supporting forward portions thereof from strips of ground to either side of said first mentioned strip, cotton sweeper means at the forward end of said apparatus for sweeping loose cotton into a windrow centrally of said first mentioned strip, counter driven long brush rolls carried along the underside of said apparatus and extending lengthwise thereof rearwardly of said sweeping means and to either side of said windrowed cotton, forwardly directed air jetting means positioned between said pair of wheels and effective to sweep the rear end of said windrowed cotton forwardly between said brush rolls, and means closely adjacent the upper sides of said brush rolls for receiving cotton discharging therefrom.

19. Apparatus as defined in claim 18 characterized in the provision of rotating debris rejector means positioned above said brush rolls and in the path of the cotton delivered therefrom, said debris rejector means having blades thereon engageable with foreign objects elevated from the ground by said brush rolls and effective to cast the same laterally out of said apparatus.

20. Apparatus as defined in claim 19 characterized in that said cotton receiving means comprises a rotating toothed cylinder extending lengthwise above and generally centrally between said brush rolls, said debris and foreign matter rejector means being positioned along one side of said toothed cylinder with its blades positioned close to said toothed cylinder, and support means for said rejector means arranged to permit said rejector means to shift bodily away from said toothed cylinder momentarily while passing and casting from the apparatus a foreign object of greater size than the normal spacing between said toothed cylinder and said rejector means.

21. Apparatus as defined in claim 20 characterized in the provision of drive means for said toothed cylinder including slip clutch means which is ineffective to drive said cylinder should a foreign object become lodged thereagainst and operating to resume rotation of said cylinder as soon as the foreign object has been purged.

22. Apparatus as defined in claim 18 characterized in the provision therein of means for separating cotton stalks and other plant debris present in the salvaged cotton, said separating means including a plurality of rotating toothed cylinders mounted on parallel axes, rotating debris destructor means having blades engageable with foreign matter carried by cotton impinged on the teeth of said toother cylinders and effective to break the same into small pieces while flinging the same away from said teeth, reticulated means arranged opposite said toothed cylinders with openings through which said debris can pass while retaining the cotton.

23. Apparatus as defined in claim 21 characterized in the provision of toothed doffer means closely spaced to the side of the toothed cylinder last receiving cotton undergoing cleaning and separation from debris, means for operating said doffer means at higher speed than said last mentioned toothed cylinder so as to pick the cotton off the teeth thereof and for flinging the same into an air passage, and means for passing air through said air passage to carry away cleaned cotton.

24. Cotton cleaning apparatus having a main frame and adapted to be advanced along rows of cotton plants to salvage fallen cotton, a plurality of toothed cylinders mounted therein on parallel axes and in closely spaced relation with the teeth of adjacent pairs sufficiently close to permit transfer of cotton impinged on the teeth of one cylinder onto the teeth of the other, means for driving said cylinders at progressively higher speeds in the path of cotton flow through said apparatus, a plurality of bladed debris destructor rolls mounted on axes parallel to said toothed cylinders with the tips of their blades closely beside the teeth of at least one of said toothed cylinders, means for rotating said destructor rolls at a higher speed than the adjacent toothed cylinder whereby the destructor engages cotton stalks and other plant debris and foreign matter in the cotton impaled on the toothed cylinders to destruct the same and to fling pieces thereof away from said cylinders, means permitting said foreign matter to be flung from said apparatus, and means for removing cleaned cotton from the periphery of the fastest rotating toothed cylinder.

25. Cotton cleaning apparatus having a main frame, a plurality of toothed cylinders supported therein on parallel axes and sufficiently close as to transfer cotton from one another in a generally upward path of flow for cotton undergoing cleaning, means for driving said cylinders in opposite directions at progressively higher speeds in the path of cotton flow to facilitate the transfer of cotton therebetween, rotary debris destructor means ararnged lengthwise of and closely beside said cylinders engageable with debris carried by cotton impinged on said cylinders, means for driving said destructor means at substantially higher speeds than adjacent ones of said cylinders whereby the same are effective to break up cotton stalks and the like debris while flinging the same away from cotton impinged on the cylinders, and reticulated means spaced away from the sides of said cylinders past which broken debris can escape.

26. Apparatus as defined in claim 25 characterized in the provision of means having an outlet opening of adjustable size along the side of said apparatus opposite the zone between the two slowest rotating cylinders and through which foreign matter substantially heavier than the cotton can escape as the cotton is undergoing transfer between said two slowest cylinders.

27. Apparatus as defined in claim 24 characterized in the provision of means for supplying cotton to be cleaned into the teeth of the slowest toothed cylinder, and means including means for providing a stream of air past the fastest rotating toothed cylinder for removing cleaned cotton therefrom and conveying the same away from said apparatus.

28. Apparatus as defined in claim 27 characterized in that said means for removing cotton from the fastest rotating cylinder comprises a toothed doffer cylinder, the leading edges of said doffer teeth being so disposed with respect to radial lines thereagainst as to be ineffective to retain the cotton against centrifugal forces whereby the cotton is flung therefrom into said moving stream of air.

29. cotton salvaging apparatus for recovering loose cotton from ground level comprising, a self-propelled vehicle, wheel-supported salvaging apparatus movably supported across the forward end of said vehicle and wheel-supported on the ground when in use to salvage fallen cotton from the ground, hoisting means interconnecting said vehicle and said salvaging apparatus and including means for lifting said salvaging apparatus, including the wheel support therefor, very substantially above the ground and to support the same entirely from said vehicle when not engaged in actual recovery of cotton from ground level.

30. Cotton salvaging apparatus as defined in claim 29 characterized in the provision of a cotton storage receptacle for the recovered cotton supported on said vehicle and independently of said salvaging apparatus.

31. Cotton salvaging apparatus as defined in claim 29 characterized in that said salvaging apparatus includes a main frame, a plurality of similar and independent cotton recovery and cleaning units movably supported by and depending from said main frame and each disposed for advancement between different pairs of adjacent rows of cotton plants, and each of said units including separate power driven means operating close to but substantially out of contact with the ground for recovering loose cotton on or near the ground and discharging the same upwardly into said units, and suction air means for conveying cleaned cotton from each of said cleaning units into a storage receptacle carried by said vehicle.

32. Cotton salvaging apparatus as defined in claim 31 characterized in the provision of blower means for supplying air under pressure, and a plurality of air jetting means along either side of each of said units arranged to jet air crosswise of the path of advance and close to the ground, said air jetting means including jets directed crosswise of the rows of cotton plants and effective to blow loose cotton into the center of the strip of ground between rows of cotton plants.

33. Cotton salvaging apparatus as defined in claim 31 characterized in the provision of ground-contacting roller means attached to and supporting the rear end portions of said units when in cotton recovery position, and power operated means positioned between said units and said main frame for adjusting said units toward and away from the ground to obtain the most effective cotton recovery operation of said units.

34. Cotton salvaging apparatus as defined in claim 33 characterized in that said means for adjusting said cotton recovery units includes means for simultaneously adjusting each of said units in the same direction and by substantially the same increment.

35. Cotton salvaging apparatus as defined in claim 31 characterized in the provision of means including spring means for supporting the forward ends of said cotton recovery unit by suspension from said main frame and independently of ground contacting support means between the ground and the forward end of said units.

36. Cotton salvaging apparatus for use in recovering loose cotton from cotton fields comprising, a salvaging apparatus propulsion vehicle, salvaging apparatus attached thereto and adapted to be advanced along multiple rows of cotton plants, means thereon for gathering loose cotton across the ground into windows extending lengthwise and centrally between rows of cotton plants, power driven brush means for lifting cotton in said windrows off the ground, cotton cleaning means positioned at a level substantially above the ground and above said brush means operable to receive cotton from said windrows and to separate and eject debris therefrom back to the ground, and air jet means cooperating with said brush means in recovering said cotton from the ground.

37. Cotton salvaging apparatus as defined in claim 29 characterized in the provision of a driver operating station at the upper forward end of said self-propelled vehicle and so positioned as to enable the driver to view the path of advance as well as the operation of each cotton recovery unit from a level above and rearward of these units.

38. Cotton salvaging apparatus as defined in claim 29 characterized in the provision of a separate rigid supporting frame surrounding each of said cotton recovery units, means separably securing each unit to an associated one of said last mentioned frames, and other means movably and adjustably suspending the upper ends of said last mentioned frames from said main frame.

39. Cotton salvaging apparatus as defined in claim 38 characterized in that said frames for suspending said units from said main frame include tubular members, and means for delivering air under pressure to said tubular members for flow to air jetting ports positioned near ground level and arranged to direct cotton sweeping air jets across the ground.

40. Cotton salvaging apparatus as defined in claim 38 characterized in the provision of power driven cotton sweeping means rotating about generally vertical axes and offset to either side of the center of the strip of ground between two rows of cotton plants and effective to sweep cotton in the path thereof into a windrow centrally beneath and forwardly of said cotton recovery units.

41. Apparatus for salvaging fallen cotton from the ground of a cotton field, said apparatus including means for elevating loose cotton from the ground into a cotton cleaning zone for treatment to separate the cotton from trash, leaves and the like entrained with the cotton, a plurality of power-driven rotating cylinders mounted on parallel axes in said cleaning zone and including a plurality of toothed cylinders rotating in opposite directions at different peripheral speeds and in close proximity and effective to transfer cotton from one to the other thereof, at least one beater cylinder rotating parallel to and in close proximity to one of said toothed cylinders and effective in cooperation therewith to break up dry trash and to separate it from cotton impinged on said toothed cylinders, perforated guard means arranged in an arc closely beside the periphery of one of said toothed cylinders and through which trash can pass by centrifugal action while cotton remains impinged on the toothed cylinder, and means on said apparatus for storing cleaned cotton.

42. Cotton cleaning apparatus as defined in claim 24 characterized in the provision of means for feeding cotton to be cleaned into the lower portion of said apparatus for upward flow therethrough while undergoing cleaning, and means for removing substantially cleaned cotton from the upper portion of said apparatus.

43. Cotton cleaning apparatus as defined in claim 24 wherein said toothed cylinders are arranged to pass cotton undergoing cleaning to progressively higher elevations as cleaning progresses and being effective to cast free broken debris from the side of said apparatus while carrying the cotton upwardly to a discharge for clean cotton adjacent the top of said apparatus.

44. Cotton cleaning apparatus having a main frame, a plurality of saw-toothed cylinders supported therein on parallel axes and sufficiently close to transfer cotton directly from one to another thereof through an upward path of travel from a low-level uncleaned cotton inlet during cleaning of the cotton and the separation of debris therefrom by gravity and centrifugal action, means for rotating said cylinders in opposite directions at progressively higher speeds in the path of cotton flow to facilitate the transfer of cotton therebetween and with a minimum speed for the slowest one of said cylinders rotating in excess of 75 r.p.m., rotary debris destructor means mounted on said main frame closely adjacent at least one of said saw-toothed cylinders, and means for driving said destructor means to break up debris carried in cotton entering said apparatus and causing the same to flow in a different path from the cotton from which the debris has been separated.

45. Cotton cleaning apparatus for use in cleaning cotton while being mechanically advanced therethrough and as debris separated from said cotton is channeled away from the cotton by means utilizing gravity and centrifugal action, said apparatus having a main frame supporting a plurality of oppositely-driven rotary cylinder means cooperating to advance unclean cotton progressively directly from one to another upwardly between said cylinder means and through said apparatus, power means for rotating said plurality of cylinder means at progressively faster speeds in the path of cotton flow with the slowest one of said cylinder means being lowermost, power driven debris destructor means mounted in the upward flow path of unclean cotton and in position to engage and break debris carried in the upwardly flowing cotton into small pieces and to separate the same from the cotton and cast the same away from the cotton, and said cotton advancing means and said debris destructor means being effective to advance and clean cotton independently of an air stream to move unclean cotton from place to place upwardly through said apparatus as cleaning progresses.

46. Cotton cleaning apparatus as defined in claim 45 characterized in that said apparatus includes a plurality of arcuate grid assemblies disposed one on the opposite lateral sides of adjacent ones of said rotary cylinder means and cooperating therewith to engage and break debris as the cotton is propelled upwardly therepast by said cylinder means.

47. Cotton cleaning apparatus as defined in claim 45 characterized in that said plurality of rotary means for advancing cotton comprise counterrotating toothed cylinders arranged parallel to one another and in a substantially vertical bank.

References Cited by the Examiner

UNITED STATES PATENTS

| | | | |
|---|---|---|---|
| 1,257,543 | 2/1918 | Smith | 19—35 |
| 1,357,586 | 11/1920 | Parks | 19—36 |
| 1,428,434 | 9/1922 | Hart | 19—36 |
| 2,670,584 | 3/1954 | Rood et al. | 56—28 |
| 2,672,001 | 3/1954 | Bopf et al. | 56—14 |
| 2,674,075 | 4/1954 | Snow | 56—11 |
| 2,712,673 | 7/1955 | Wallace | 19—37 |
| 2,730,855 | 1/1956 | Thomas | 56—28 |
| 2,862,247 | 12/1958 | Vandergriff et al. | 19—37 X |
| 2,928,224 | 3/1960 | Powell | 56—28 |
| 2,938,321 | 5/1960 | Tieman | 56—12 |
| 3,035,312 | 5/1962 | Cox | 19—202 |
| 3,070,942 | 1/1963 | Mitchell et al. | 56—35 |

ABRAHAM G. STONE, *Primary Examiner.*

RUSSELL R. KINSEY, T. GRAHAM CRAVER,
*Examiners.*